M. G. CAMPAU.
CREAM TESTER.
APPLICATION FILED NOV. 14, 1910.
987,613.
Patented Mar. 21, 1911.
Fig. 1.
Fig. 3.
Fig. 4.
Fig. 2.
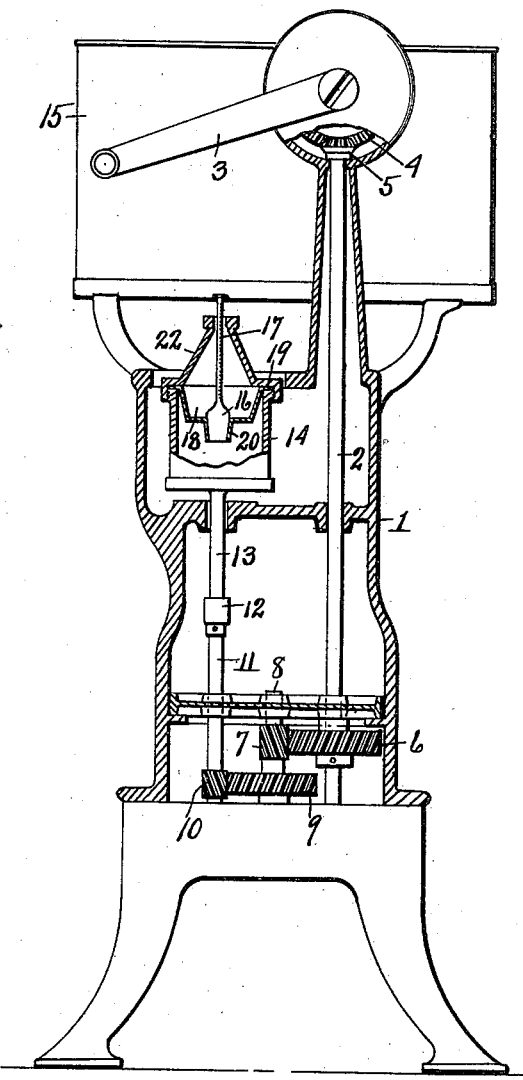
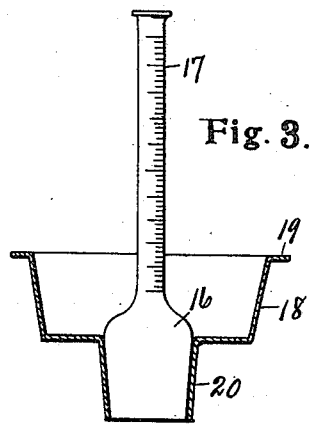
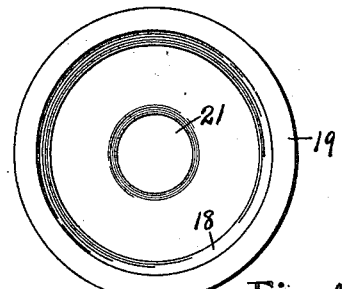
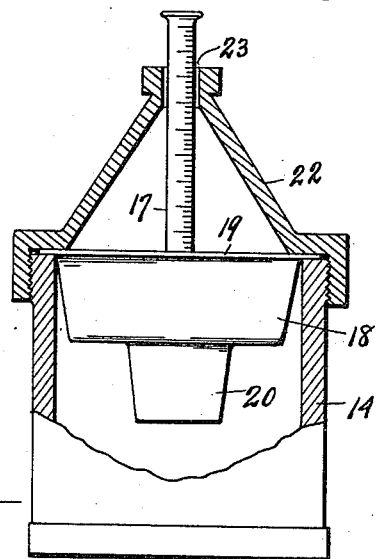
Witnesses
O. B. Baenziger
J. G. Howlett
Inventor
Merle G. Campau.
By E. S. Wheeler, Attorney.

UNITED STATES PATENT OFFICE.

MERLE G. CAMPAU, OF OCONTO, NEBRASKA.

CREAM-TESTER.

987,613.   Specification of Letters Patent.   Patented Mar. 21, 1911.

Application filed November 14, 1910. Serial No. 592,173.

*To all whom it may concern:*

Be it known that I, MERLE G. CAMPAU, a citizen of the United States, residing at Oconto, in the county of Custer, State of Nebraska, have invented certain new and useful Improvements in Cream - Testers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a cream tester adapted to be employed in connection with a cream separator, and consists in the construction and arrangement of parts hereinafter more fully set forth and pointed out particularly in the claims.

The object of the invention is to provide simple and efficient means whereby farmers and other users of cream separators, may test their cream to determine the exact amount of butter fat which it contains before offering it for sale, the arrangement being such as to enable the tester to be readily used in connection with a cream separating machine.

The above object is attained by the device illustrated in the accompanying drawings, in which:—

Figure 1 is a general view, partly in section, illustrating the application of my invention to, and the mode of employing my invention in connection with a cream separator. Fig. 2 is an enlarged view partly in section of the separator bowl and cover, illustrating the manner in which my cream tester is employed in connection therewith. Fig. 3 is a sectional view through the bottle-holder showing in elevation the bottle in which the cream is placed for testing seated therein. Fig. 4 is a plan view of the bottle-holder or dish in which the cream bottle is held.

Referring to the characters of reference, 1 designates the frame of a cream separator of a common type, wherein the vertical shaft 2 is driven by means of a crank 3 through the medium of a gear wheel 4, and a pinion 5 on the upper end of said shaft meshing with said gear wheel. At the lower end of shaft 2 is a second gear wheel 6 which meshes with a pinion 7 on a stub shaft 8. On the lower end of the stub shaft is a gear wheel 9 which meshes with a pinion 10 on the lower end of a vertical spindle 11 connected at its upper end by means of a coupling 12 with the lower end of the bowl-spindle 13 which carries at its upper end the revoluble bowl 14 of the separator. Supported upon the frame of the machine is a receptacle 15 for the milk, but the connection between said receptacle and the bowl of the separator is not shown, as such connection forms no part of this invention.

In order to determine the amount of butter fat which is contained in cream, it is necessary to separate it from the residuary fluid in which it is normally suspended. This is accomplished by centrifugal action due to a rapid rotation of a receptacle in which the cream is placed. To provide means for enabling the cream to be tested in connection with the operation of a cream separator, I employ a bottle 16 adapted to contain the cream to be tested and provided with a long graduated neck 17. This bottle during the operation of testing the cream must be held in axial alinement with the revolving spindle 13 of the bowl 14, or must be held in axial alinement with the axis of rotation about which said bowl revolves. I accomplish this result by employing a bottle-holder 18 in the form of a flaring dish provided with a marginal flange 19 and having a centrally disposed depending tube 20 tapered to coincide with the taper of the bottle 16 so that said bottle will fit snugly therein.

The diameter of the bottle-holder 18 at its upper edge is equal to the inner diameter of the bowl 14 of the separator, so that when the holder 18 is placed within said bowl, it becomes perfectly centered therein. The opening 21 through the tube 20 of the bottle-holder being centrally disposed and said holder being concentric with the bowl 14, when placed therein the axis of the bottle within the tube is made to coincide with the axis around which the bowl 14 rotates. The bottle-holder 18 is placed within the bowl 14 so that the flange 19 thereof will rest upon the top of said bowl, in which position it is securely retained in place by the conical cover 22 which is screwed onto the top of the bowl, as clearly shown in Fig. 2, in a manner to bind the flange 19 of said holder. The cover 22 has a central opening 23 at the apex thereof through which the neck of the bottle projects. This arrangement enables water to be added to the contents of the bottle at the desired time during the test without removing the cover.

In making the test, a given quantity of cream is placed in the bottle with a certain amount of sulfuric acid to darken the cream to a chocolate color; to this is added enough hot water to fill the bottle to a point just below the graduations or scale on the neck thereof. The bottle is then placed in the dish or holder 18, as shown in Fig. 3, and the holder placed in the bowl 14 of the separator and the top screwed down thereon, as shown in Figs. 1 and 2. The bowl is then revolved through the medium of the crank 3 a certain number of turns, when the machine is stopped and a sufficient quantity of warm water is added to the bottle to fill it to the top of the scale or graduation. The bowl is again revolved for a short time, when upon stopping the machine the butter fat will be seen to have risen because of its lighter specific gravity, to the top of the water so as to occupy the neck of the bottle, the reading on the scale indicating the correct amount of butter fat which the cream contains. By means of this arrangement the exact amount of butter fat which the cream contains may be ascertained by anyone having any of the centrifugal cream separators in common use, a matter of material importance to those who have cream to sell. The small cost incident to the employment of this cream tester, and the facility with which it can be used in connection with any of the cream separators of the ordinary type, renders it of great utility.

Having thus fully set forth my invention, what I claim as new and desire to secure by Letters Patent, is:—

1. In combination with the rotary bowl of a separator, a cream tester comprising a bottle-holder adapted to be connected to and to rotate with said bowl, said bottle-holder having means for holding a testing bottle concentrically therein.

2. In combination with the rotary bowl of a separator, a bottle-holder adapted to fit concentrically within said bowl and to rotate therewith, said holder having means for supporting a bottle centrally thereof, and a testing bottle supported by said holding means.

3. The combination with the rotatable bowl of a separator, of a bottle-holder removably seated in said bowl centrally thereof to rotate therewith, said bottle-holder having means for supporting a testing bottle concentrically of the axis of rotation of said bowl.

4. In combination with the rotary bowl of a cream separator, a bottle-holder comprising a flanged receptacle fitted within said bowl to rotate therewith and held concentrically thereof, a tapered tube depending centrally from said receptacle, and a testing bottle coinciding with said tube fitted therein.

5. In combination with the rotary bowl of a cream separator, a bottle-holder comprising a flanged receptacle fitted within said bowl to rotate therewith and held concentrically thereof, a tapered tube depending centrally from said receptacle, a testing bottle coinciding with said tube seated therein, and an apertured cover screwed onto said bowl through which the stem of the bottle projects.

6. In combination with the rotatable bowl of a separator, a bottle-holder in the form of a dish removably seated in said separator and having a marginal flange which extends onto the top of said bowl, a cover screwed on said bowl to engage said flange, said holder having centrally thereof a bottle-holding device and a testing bottle seated therein.

In testimony whereof, I sign this specification in the presence of two witnesses.

MERLE G. CAMPAU.

Witnesses:
JOHN T. BRIDGES,
WALTER D. EASTMAN.

---

Copies of this patent may be obtained for five cents each, by addressing the "Commissioner of Patents, Washington, D. C."